United States Patent [19]

Arimura et al.

[11] 4,209,830
[45] Jun. 24, 1980

[54] FINE OBJECT HAVING POSITION AND DIRECTION SENSING MARK AND A SYSTEM FOR DETECTING THE POSITION AND DIRECTION OF THE SENSING MARK

[75] Inventors: Yoshiaki Arimura, Yokohama; Hideharu Egawa, Tokyo; Yasoji Suzuki, Ayase, all of Japan

[73] Assignee: Tokyo Shibaura Electric Co., Ltd., Japan

[21] Appl. No.: 932,400

[22] Filed: Aug. 9, 1978

Related U.S. Application Data

[62] Division of Ser. No. 789,000, Apr. 19, 1977, abandoned.

[30] Foreign Application Priority Data

Apr. 19, 1976 [JP] Japan .................................. 51-43715
Jul. 30, 1976 [JP] Japan .................................. 51-90176

[51] Int. Cl.² ............................................. G06F 15/46
[52] U.S. Cl. .................................... 364/490; 356/399; 357/55
[58] Field of Search ............... 364/490, 491, 468, 107; 356/399–401; 357/55; 250/237 G, 571

[56] References Cited

U.S. PATENT DOCUMENTS

| 3,670,153 | 6/1972 | Rempert et al. ..................... 364/107 |
| 3,955,072 | 5/1976 | Johannsmeier et al. ............. 364/490 |

Primary Examiner—Errol A. Krass
Attorney, Agent, or Firm—Finnegan, Henderson, Farabow, Garrett & Dunner

[57] ABSTRACT

A position and direction sensing mark is formed on an integrated circuit pellet formed with a prescribed electrode pattern. The position and direction sensing mark comprises a plurality of strips which are extended in a direction different from that in which the electrode pattern is extended and are arranged in turn at prescribed intervals in a direction intersecting the different direction at right angles thereto.

9 Claims, 7 Drawing Figures

FINE OBJECT HAVING POSITION AND DIRECTION SENSING MARK AND A SYSTEM FOR DETECTING THE POSITION AND DIRECTION OF THE SENSING MARK

This is a division of application Ser. No. 789,000, filed Apr. 19, 1977, and now abandoned.

BACKGROUND OF THE INVENTION

This invention relates to a fine object formed with a position and direction sensing mark.

In the microelectronics technique, for example, integrated circuit technique, when an integrated circuit pellet obtained by forming a specified circuit on a semiconductor pellet and subjecting the resulting pellet to electrode patterning is further subject to bonding process, there is a necessity of sensing the position and direction of the integrated circuit pellet disposed on a bed for the bonding operation. In sensing the position and direction of the integrated circuit pellet, a surface of the pellet is detected by means of an image pickup tube, whereby the position and direction of the pellet is detected by a signal based on a position and direction sensing mark formed on the pellet. In such conventional position and direction detecting method, the electrode pattern on the pellet was erroneously taken as a position and direction detecting mark, often leading to the failure to precisely detect the position and direction of the pellet. For this reason, the bonding operation for the integrated circuit pellet was often erroneously carried out.

SUMMARY OF THE INVENTION

It is accordingly the object of the invention to provide a fine object formed with a prescribed pattern and a position and direction sensing mark permitting the precise detection of the position and direction of the fine object, and a system for sensing the position and direction of a fine object, which is directed to precisely detecting the position and direction of the fine object in accordance with a position and direction sensing mark formed thereon.

According to the invention, a fine object is provided which is formed with a prescribed pattern and a position and direction sensing mark, which is directionally different from the prescribed pattern.

Further, according to the invention, a system for detecting the position and direction of a fine object formed with a prescribed pattern and a position and direction sensing mark directionally different from the prescribed pattern is provided which comprises a scanning device for scanning the fine object with a plurality of scanning lines; a wave shaper circuit for converting the image signal from the scanning device into a pulse signal; a plurality of delay circuits for delaying the pulse signal from the wave shaper circuit for a time period equal to an integral multiple of one horizontal scanning time; an AND circuit for producing a logical sum of the output pulse signals of the delay circuits, a counter circuit for, in response to the AND signal from the AND circuit, counting the number of scanning lines and/or time period of scanning, required by the time when the position and direction sensing mark is detected; and an arithmetic circuit for arithmetically calculating the position of the mark in accordance with the output signal of the counter circuit.

DETAILED DESCRIPTION OF THE PREFERRED EMBODIMENT

Figure 1:
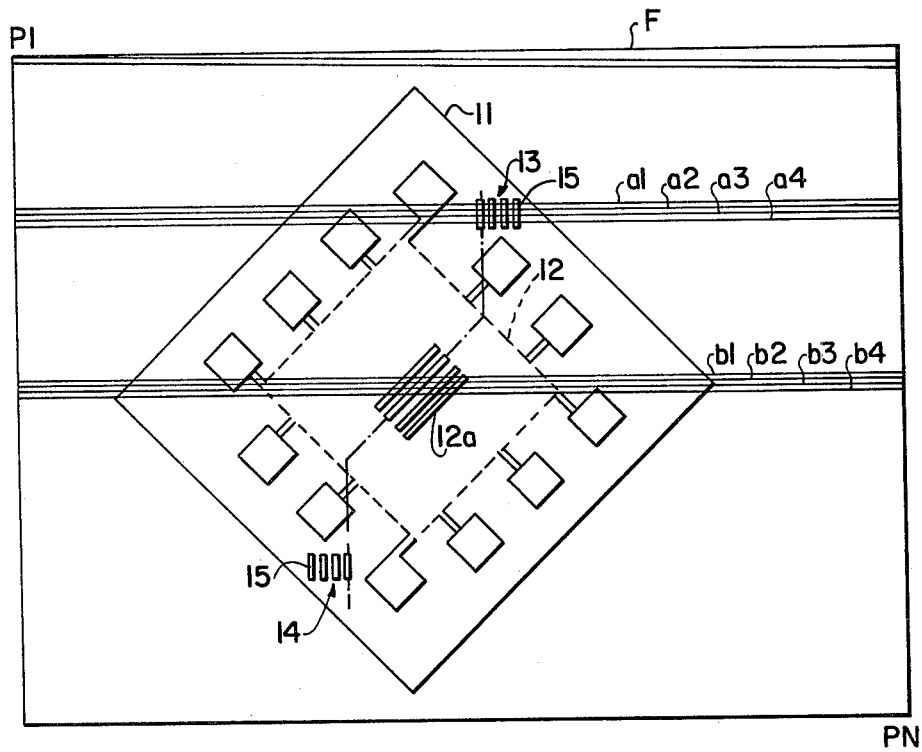
FIG. 1 is a plan view of a fine object according to an embodiment of the invention.
Figures 3, 5:
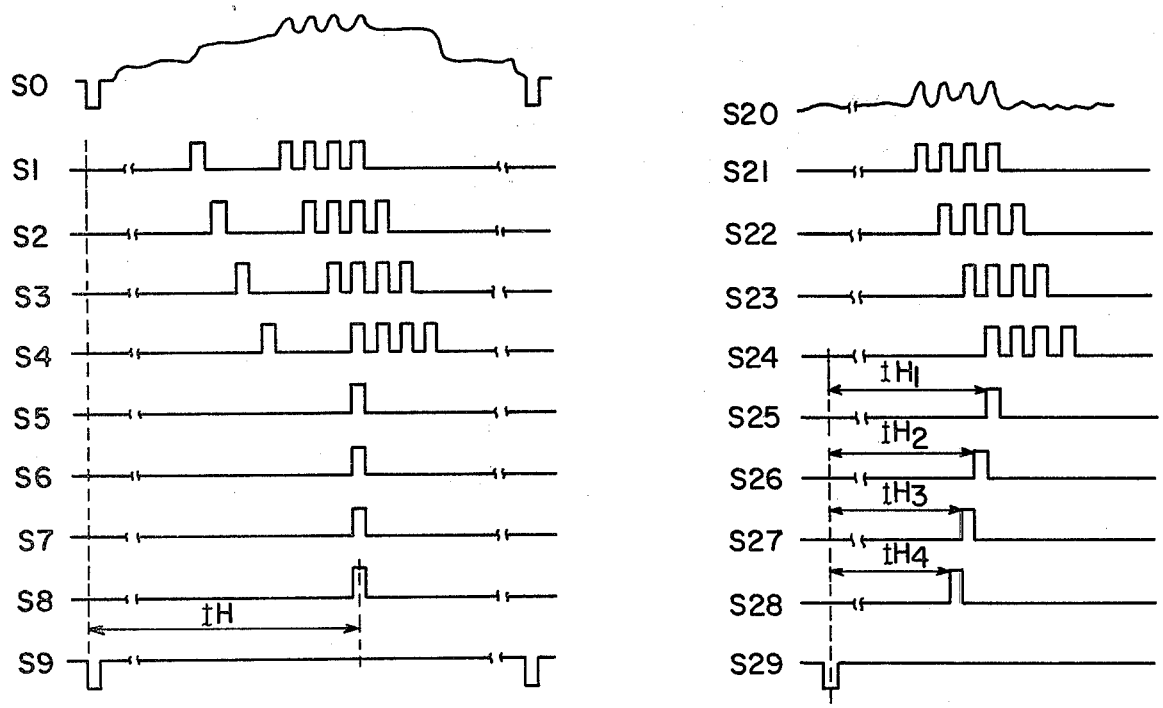
FIG. 3 shows the waveforms of image signals of the mark obtained by scanning the same and those of position and direction detecting signals obtained in accordance with those image signals.
FIG. 5 shows the waveforms of image signals corresponding to an electrode pattern and those of pulse signals obtained in accordance with those image signals.
Figure 2:
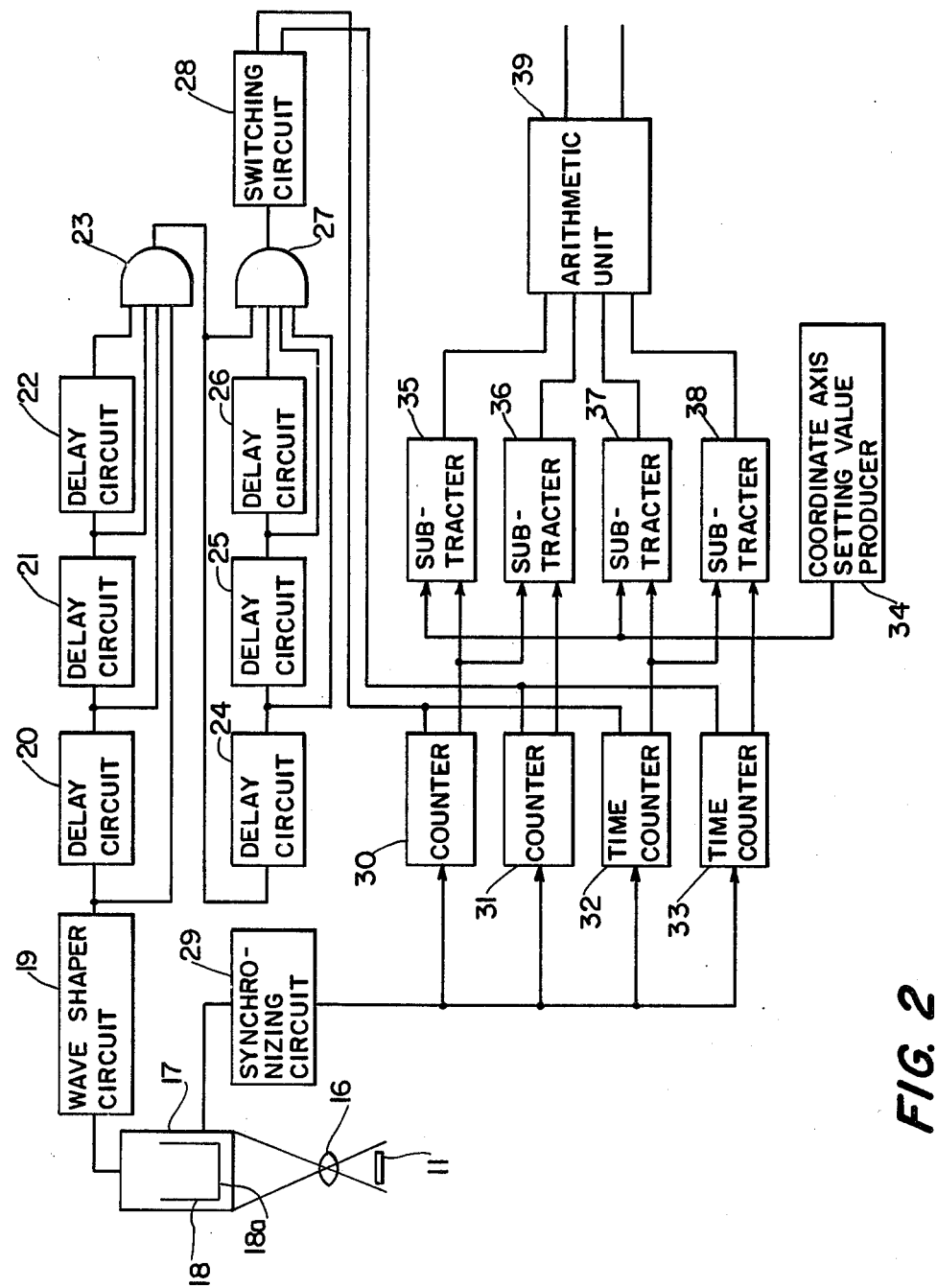
FIG. 2 is a block circuit diagram of a system for detecting the position and direction of the fine object in accordance with a position and direction sensing mark formed thereon.
Figure 4:
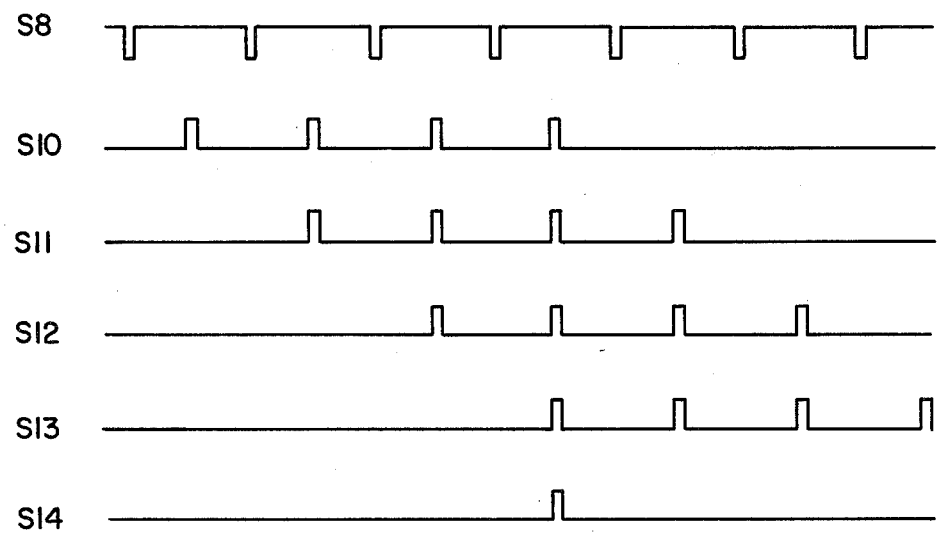
FIG. 4 shows the waveforms of pulse signals corresponding to a plurality of scanning lines having scanned the mark and those of delayed pulse signals obtained by delaying those pulse signals.

In FIG. 1, an integrated circuit pellet (which is hereinafter referred to as "IC pellet") is shown as an example of a fine object. The IC pellet is formed with a prescribed electrode pattern 12. In this Figure, for clarification of explanation, the prescribed electrode pattern is shown as a region enclosed by a broken line, only a part 12a of the pattern being shown in detail in the region enclosed. On the surface of the IC pellet 11 two position and direction sensing marks 13, 14 are formed outside the electrode pattern 12. The sensing marks 13, 14 are each formed of four strips 15 arranged in a specified direction in a manner equidistantly spaced from each other and having the same width. The strips 15 of the sensing marks 13, 14 are each extended in a direction different from that in which the electrode pattern 12a is extended, in a manner defining a specified angle of, for example, 135° with respect to the extended direction of the electrode pattern 12a. The strips 15 of the sensing marks 13, 14 are each arranged in a manner defining an angle of, for example, 45° with respect to the extended direction of the electrode pattern 12a, namely in a direction intersecting the extended direction of the strip at right angles thereto. Hereinafter, explanation is made, by reference to FIG. 2, of a system for determining the position and direction of the IC pellet 11 by detecting such position and direction sensing marks 13, 14. Referring to FIG. 2, the surface of the IC pellet 11 formed with the position and direction sensing marks 13, 14 and the electrode pattern 12 is focussed, by an optical lens 16, on the image pickup screen 18a of an image pickup tube 18 in an ITV camera and is scanned by scanning lines. Let's now consider those four scanning lines a1, a2, a3 and a4 during such scanning operation which are scanning the sensing mark 13. When it is now assumed that the scanning line a1 have scanned the sensing mark 13, such an image signal S0 as shown in FIG. 3 is obtained from the ITV camera 17. The image signal S0 is differentiated by a wave shaper circuit 19 and the signal thus differentiated is converted into a pulse signal S1 corresponding to the rising component thereof. The pulse signal S1 is delayed by delay circuits 20, 21 and 22 for a time period of T, 2T and 3T in turn. From the delay circuits 20, 21 and 22 are produced such pulse signals S2, S3 and S4 as shown in FIG. 3, respectively. When the delayed pulse signals S2, S3 and S4 and the non-delayed pulse signal S1 are supplied to an AND gate 23, an AND signal S5 is produced from the AND gate 23. Similarly, AND signals S6, S7 and S8 are obtained correspondingly to the scanning lines a2, a3 and a4, respectively. These four AND signals S5, S6, S7 and S8 are generated in turn at a time interval equal to the scanning time period H of one scanning line in response to a synchronizing pulse in a manner each delayed by a time period tH from the synchronizing pulse of the horizontal scanning signal of its corresponding scanning line. The AND signals S5, S6, S7 and S8 generated in turn at a time interval of H from the AND gate 23 in response to the four scanning lines a1, a2, a3 and a4, respectively, appear in the form of a signal S10 shown in FIG. 4. The signal S10 is composed of four pulses having a pulse interval of H and supplied to a first delay circuit 24 of series-connected delay circuits 24, 25 and 26. As a result, from the delay circuits 24, 25 and 26 are generated such pulse signals S11, S12 and S13 as shown in FIG. 4, respectively. These pulse signals S11, S12 and S13 are delayed by time intervals of H, 2H and 3H from the signal S10, respectively. When such pulse signals S11, S12 and S13 are supplied to an AND gate 27 together with the signal S10, such a signal S14 as shown in FIG. 4 is produced from the AND gate 27. The signal S14 is supplied to a switching circuit 28. On the other hand, a synchronizing signal from a horizontal-to-vertical synchronizing signal generator circuit 29 is supplied to counters 30, 31 and also to time counters 32, 33. The counters 30, 31 are each designed to count horizontal synchronizing pulses in response to a vertical synchronizing signal in order to count the number of scanning lines when a scanning field of the ITV camera 17, i.e., a frame F thereof is scanned over a region from the start point P1 of scanning to the termination point PN of scanning. The counter 30 designed to count the number of such scanning lines is so constructed as to stop its counting operation in response to the signal from the switching circuit 28 corresponding to the signal S14. The counted value A of the counter 30 when it stops its counting operation coincides with the number of scanning lines required by the time when the sensing mark 13 is arrived at. The output of the counter 30 is supplied to a subtracter 35 together with the output of a coordinate axis setting value producer 34. This setting value producer 34 is set at a scanning line position corresponding to ½ of the number N of scanning lines required to scan the entire scanning field F, and produces an information signal V corresponding to a value as the origin of the Y coordinate axis. Accordingly, the subtracter 35 performs a subtracting operation between the output information A of the counter 30 and the output information V of the producer 34 to produce a signal representing the coordinate value of V-A. Depending upon the coordinate value of V-A, the $Y_1$ coordinate value, within the field F, of the sensing mark 13 is determined in accordance with the following formula.

Namely, when $V-A>0$, the $Y_1$ coordinate value exists within the region of the $+Y$ coordinate, when $V-A=0$, the $Y_1$ coordinate value exists on the origin of the Y coordinate axis, and when $V-A<0$, the $Y_1$ coordinate value exists within the region of the $-Y$ coordinate.

Further, the X coordinate value, within the field F, of the sensing mark 13 is determined as follows. In so determining, measurement is made of the time interval between the time point when the X axis synchronizing signal, i.e., the horizontal synchronizing pulse is generated and the time point when the above-mentioned mark detection signal S14 is generated. Namely, the time counter 32 makes its counting operation in response to the horizontal synchronizing pulse from the horizontal-to-vertical synchronizing signal generator circuit 29 and stops its counting operation in response to the mark sensing signal S14. The counted value of the time counter 32 when it stops its counting operation corresponds to a scanning time period C required to scan from the start point of one horizontal scanning line to the position at which the sensing mark 13 is situated. The information signal from the counter 32 is supplied to a subtracter 37 together with the information signal from the coordinate axis setting value producer 34 which corresponds to the origin of the X coordinate axis. This X coordinate axis origin information indicates a value W corresponding to half the scanning time period T for one horizontal scanning line. By the subtraction between the X coordinate axis origin information W and the output information C of the time counter 32 and the $X_1$ coordinate value of the sensing mark 13 is obtained from the following relationships.

Namely, when $W-C>0$, the $X_1$ coordinate value exists in the region of the $-X$ coordinate, when $W-C=0$, the $X_1$ coordinate value exists on the origin of the X coordinate axis, and when $W-C<0$, the $X_1$ coordinate value exists in the region of the $+X$ coordinate.

As mentioned above are determined the $X_1$ and $Y_1$ coordinate values representing the position of the position and direction sensing mark 13.

Next, when scanning by scanning lines goes on to scan the other position and direction sensing mark 14, a signal (not shown) similar to the above-mentioned signal S14 is obtained from the AND gate 27 in the same manner as in the above-mentioned sensing mark 13. Upon receipt of a signal obtained, in response to this not shown signal, from the switching circuit 28 through the other output terminal thereof, the counter 31 and the time counter 33 are controlled and are set with an information signal representing the position of the sensing mark 14. Namely, the information of the counter 31 corresponds to the number B of scanning lines required to scan a region from the start point P1 of scanning to the position at which the sensing mark 14 is located. The information of the counter 33 corresponds to a scanning time period D required to scan from the start point of one horizontal scanning line to the position at which the sensing mark 14 is situated. The output signals of the counters 31 and 33 are supplied to subtracters 36 and 38 together with the output signals of the counters 30 and 32, respectively. Thus, the subtracter 36 makes a subtraction of A−B to determine the $Y_2$ coordinate value of the sensing mark 14.

Namely, when $A-B<0$, the $Y_2$ coordinate value exists in the region of the $-Y$ coordinate extended from the $Y_1$ coordinate value forward $-\infty$, when $A-B=0$, the $Y_2$ coordinate value exists on the Y coordinate axis as in the $Y_1$ coordinate value, and when A−B>0, the Y₂ coordinate value exists in the region of the +Y coordinate extended from the Y₁ coordinate value forward +∞.

On the other hand, the subtracter 33 makes a subtraction of C−D to determine the X₂ coordinate value of the sensing mark 14.

Namely, when C−D>0, the X₂ coordinate value exists in the region of the −X coordinate extended from the X₁ coordinate value toward −∞.

when C−D=0, the X₂ coordinate value exists on the X coordinate axis as in the X₁ coordinate value, and when C−D<0, the X₂ coordinate value exists in the region of the +X coordinate extended from the X₁ coordinate value toward +∞.

The X₂ and Y₂ coordinate values representing the position of the position and direction sensing mark 14 are determined in such a manner as described above.

When determination has been made of both coordinates (X₁, Y₁) and (X₂, Y₂) of the position and direction sensing marks 13 and 14, the central coordinate (X₀, Y₀), and the angle of inclination, of the IC pellet 11 formed with the sensing marks 13 and 14 can be determined as shown in the following formula.

$$X_0 = (X_1 + X_2)/2 \quad (1)$$

$$Y_0 = (Y_1 + Y_2)/2 \quad (2)$$

$$\theta = \tan^{-1} \frac{X_2 - X_1}{Y_1 - Y_2} \quad (3)$$

The calculations of the above formula (1), (2) and (3) are carried out by means of an arithmetic unit 39 designed to receive the output signals from the subtracters 35 to 38. Information signals corresponding to the central coordinate and angle θ of inclination of the IC pellet determined by the arithmetic unit 39 are produced from the same and are supplied to, for example, a control circuit of a bonding device.

The foregoing description referred to the case where detection was made, by the ITV camera 17, of the position and direction sensing marks 13 and 14 which were each directionally different from the electrode pattern 12 of the IC pellet.

Figure 6:
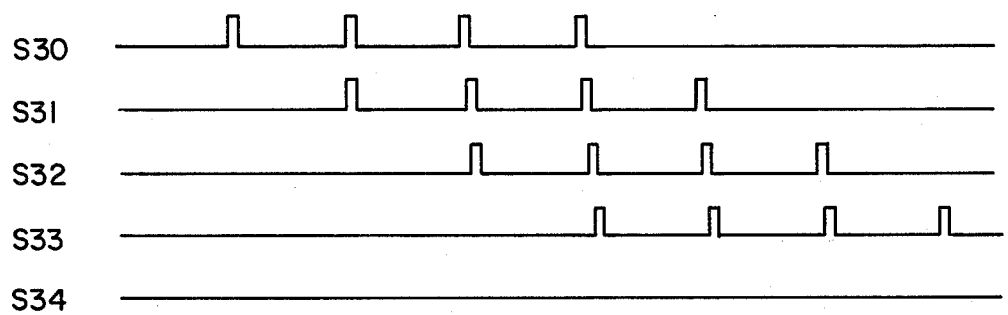
FIG. 6 shows the waveforms of electrode pattern pulse signals corresponding to a plurality of scanning lines scanning the electrode pattern and those of delayed pulse signals obtained by delaying those electrode pattern pulse signals.

Hereinafter, description will be made of the detection of the part 12a of the electrode pattern 12. Assume now that, as shown in FIG. 1, the electrode pattern 12a be scanned by four scanning lines b1, b2, b3 and b4. Then, when the initial scanning line b1 has scanned the electrode pattern 12a, an image signal S00 (FIG. 5) is generated from the ITV camera 17, which corresponds to the electrode pattern scanned by the scanning line b1. The image signal S20 has its waveform shaped into a pulse signal S21 by the wave shaper circuit 19. The pulse signal S21 is supplied to the delay circuit 20. As a result, from the delay circuits 20, 21 and 22 are generated such pulse signals S22, S23 and S24, delayed by T, 2T and 3T from the pulse signal S21, as shown in FIG. 5, respectively. The pulse signals S22, S23 and S24 are supplied to the AND gate 23 together with the pulse signal S21, whereby a pulse signal S25 is generated from the AND gate 23. This pulse signal S25 is generated in a manner delayed by TH1 from the corresponding horizontal synchronizing pulse S29. Similarly, pulse signals S26, S27 and S28 corresponding to the scanning lines b2, b3 and b4 are taken out from the AND gate 23. These pulse signals S26, S27 and S28 are generated in a manner delayed by TH2, TH3 and TH4 from the corresponding horizontal synchronizing pulse S29, respectively. Since the pulse signals S21 to S24 are not true signals based on the detection of the sensing marks 13 and 14 but are false signals and have to be removed. This removal is performed as follows. As shown in FIG. 5, the time intervals TH1, TH2, TH3 and TH4 between the false signals S25, S26, S27 and S28 and the corresponding horizontal synchronizing pulses S29 are different from each other. The reason is that since the electrode pattern 12a is provided in a manner inclined with respect to the scanning lines b1 to b4, the scanning time period required for, for example, the scanning line b1 to arrive at the electrode pattern 12a is different from the scanning time period required for the next scanning line b2 to arrive at the electrode pattern 12a. The false signals S25 to S28 are supplied, as such a serial signal S30 as shown in FIG. 6, to the delay circuit 24 from the AND gate 23. As a result, from the delay circuits 24, 25 and 26 are generated pulse signals S31, S32 and S33 with their respective time delays of H, 2H and 3H as measured with respect to the pulse signal S30. These pulse signals S31 to S33 are indeed supplied to the AND gate 27 together with the pulse signal S30. When the pulse signals S30 to S33 are supplied to the AND gate 27, only such a signal S34 as shown in FIG. 6, i.e. a signal having no pulse component whatsoever is obtained from the AND gate 27. Accordingly, the false pulse signal S34 based on the detection of the electrode pattern 12a is discriminated from the true pulse signal S14 based on the detection of the sensing marks 13 and 14.

As above described, this invention can prevent part of a pattern formed on a fine object from being erroneously detected as a position and direction sensing mark formed on the fine object, and accordingly enables at all times the precise detection of the position and direction of the fine object in accordance with the sensing mark.

The foregoing description referred to the case where the IC pellet was disposed relatively to the ITV camera in such a manner as to permit the sensing mark to just intersect the scanning line at right angles thereto. But the IC pellet is not always disposed in such manner. For example, where the IC pellet is disposed relatively to the ITV camera in a manner inclined with respect to the scanning line, the ITV camera or the bed on which IC pellet is mounted is indeed so moved that the sensing mark may intersect the scanning line at right angles thereto. In this case, however, the sensing mark may not be so arranged as to just intersect the scanning line at right angles thereto, namely may be arranged to intersect the scanning line at an angle of, for example, 90° ± about 5° thereto; provided, however, that in this case the strip of the sensing mark is formed with a somewhat large width so as to permit the mark to be detected precisely. Further, where the strip of the mark is formed with a small width, the position and direction sensing system is so constructed that a pulse signal based on the detection of the mark may have a large pulse width.

Further, the foregoing description referred to the case where the AND gates 23 and 27 were supplied with non-delayed signal S1 from the wave shaper circuit 19 and, directly with the non-delayed signal S10 from the AND gate 23, respectively. But these non-delayed signals S1 and S10 are not always necessary, and a mere respective supply, to the AND gates 23 and 27, of the delayed signals group of S2, S3 and S4 and of the delayed signals group of S11, S12 and S13 would well serve the purpose.

Further the foregoing description referred to the case where the number of scanning lines required to scan from the start point of the frame F to the marks 13 and 14 was counted and determination was made of the $Y_1$ and $Y_2$ coordinate values in accordance with this counted value. But according to the invention those $Y_1$ and $Y_2$ coordinate values may be determined by counting the scanning time period required to scan from the start point P1 of the frame F to the marks 13 and 14.

Figure 7:
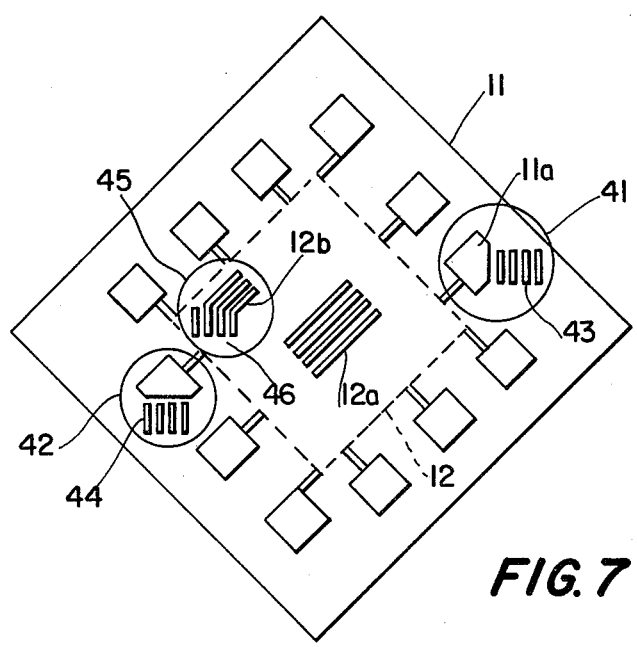
FIG. 7 is a plan view of the fine object formed with a modified position and direction sensing mark.

In the foregoing embodiment, the position and direction sensing mark 13 or 14 is so formed that the direction in which each strip thereof is extended defines an angle of 135° with respect to the direction in which the electrode pattern 12a is extended. But the angle defined between the arrangement of the sensing mark strips and that of the electrode pattern is not limited to 135°, and the point is that the sensing mark strips have only to be so formed that the extended direction thereof may be inclined with respect to the extended direction of the electrode pattern. Further, the sensing mark 13 or 14 does not have to be formed into such configuration, and at such position, as shown in FIG. 1. Namely, for example, as shown by a circle 41 or 42 of FIG. 7 the sensing mark may be formed by cutting off the angular portion of one square bonding pad 11a of the IC pellet 11 so as to permit the cut-off face thereof to be inclined with respect to the extended direction of the electrode pattern and sequentially arranging on disposing a plurality of mark strips 43 or 44 in parallel to, or vertically to, the cut-off face of the square bonding pad 11a.

Further, each of the sensing marks 13 and 14 may not be formed of four rectangular strips having the same width and arranged in a manner equidistantly spaced from each other. The number of the width of, and the interval between, the mark strips may be optionally varied or changed. In this case, however, the delay circuits 20, 21 and 22 for subjecting the resulting image signals to delay processing should be designed to be correspondingly changed in time delay, respectively. Further, as above described, the sensing mark may be formed on the IC pellet after it is manufactured, but the simultaneous formation, by photoetching, of the sensing mark thereon with the manufacture thereof would enable a simplification of the pellet manufacturing process. Further, if the sensing mark is formed of aluminum material of which the electrode pattern is formed, or of insulating film covering the IC pellet, the manufacture of the pellet will become easier. In this case, the sensing mark can be used as part of the function of the IC pellet, for example, as part of the electrode pattern.

Further, the above-mentioned embodiment referred to the case where the IC pellet was used as the fine object, but other given fine objects may be used.

What we claim is:

1. A method for detecting the position and direction of an object on which are disposed an integrated circuit pattern and at least two key marks having a directionality different from that of the integrated circuit pattern, comprising the steps of scanning the object with a plurality of horizontal scanning lines to generate image signals corresponding to the integrated circuit pattern and the key marks; discriminating the image signals corresponding to the key marks from the image signals corresponding to the integrated circuit pattern on the basis of the difference of the directionality therebetween; detecting the respective positions of the key marks on the scanning region in response to the key mark image signals to obtain two coordinate signals corresponding to the key mark positions respectively; and arithmetically producing the center coordinate of the object on the scanning region from the two key mark coordinate signals.

2. A method for detecting the position and direction of an object according to claim 1 wherein the detecting of the key marks comprises counting scanning time from the start point of the scanning to each of the key marks and calculating the position of each of the key marks from the scanning time.

3. An apparatus for detecting the position and direction of an object on which are formed an integrated circuit pattern having at least one directionality and at least two key marks each having a directionality different from that of the integrated circuit pattern, comprising: a scanning device for scanning a scanning region including the object to generate an image signal which includes image signal components corresponding to the integrated circuit pattern and having a feature corresponding to the directionality thereof, and image signal components corresponding to the key marks and having a feature corresponding to the directionality thereof; means for discriminating the key mark image signal components from the integrated circuit pattern image signal components; means for calculating the position coordinates of the key marks on the scanning region in response to the key mark image signal components; and means for detecting the position and direction of the object by computing the center coordinate thereof from the position coordinates of the key marks.

4. An apparatus for detecting the position and direction of an object on which are formed an integrated circuit pattern having at least one directionality and at least two key marks each having a plurality of strips extended in parallel to each other but in a direction different from the directionality of the integrated circuit pattern, comprising: a scanning device for scanning a scanning area including the object to generate an image signal which includes an IC pattern image signal component corresponding to the integrated circuit pattern and key mark image signal components corresponding to the key marks; means for discriminating the key mark signal component from the IC pattern signal component to generate a mark sensing signal; first means for calculating the position coordinates of the key marks on the scanning region in response to the mark sensing signal from the discriminating means; and a second means for calculating a center coordinate of the object from the position coordinates of the key marks thereby to detect the position and direction of the object.

5. An apparatus according to claim 4 wherein said discriminating means comprises a wave shaper circuit for converting the image signal into a pulse signal including an IC pattern pulse signal corresponding to the IC pattern image signal component and key mark pulse signals corresponding to the key mark signal components, means for delaying the pulse signal from the wave shaper circuit with different delay times to produce a plurality of delayed pulse signals; and an AND gate circuit supplied with at least the delayed pulse signals from the delaying means to generate the mark sensing signal in response to the delayed pulse signals corresponding to each of the key mark pulse signals.

6. An apparatus according to claim 5 wherein said first calculating means comprises a counter circuit for starting a counting operation in response to a scanning start of the scanning device and stopping the counting operation in response to the mark sensing pulse from the AND gate circuit and means for calculating X and Y coordinates of each of the key marks on the basis of the contents of the counter circuit.

7. An apparatus according to claim 5 wherein said AND gate circuit is further supplied with the pulse signal from the wave shaper circuit.

8. An apparatus for detecting the position and direction of an object on which are formed an integrated circuit pattern having at least one directionality and at least two key marks each having a plurality of strips extended in parallel to each other but in a direction different from the directionality of the integrated circuit pattern, comprising: a scanning device for scanning the scanning area including the object with a number of scanning lines to generate an image signal which includes an IC pattern image signal component corresponding to the integrated circuit pattern and respective key mark image signal components corresponding to the two key marks, said scanning device including a synchronizing circuit generating a synchronizing signal; a wave shaper circuit connected to the scanning device for converting the image signal into an image pulse signal including an IC pattern pulse signal corresponding to the IC pattern image signal component and two key mark pulse trains corresponding to the respective key mark image signal components; a delay circuit section connected to the wave shaper circuit for delaying the image pulse signal to generate a plurality of delayed pulse signals with different delay times equal to respective integral multiples of scanning time of one scanning line; an AND gate circuit connected to the delay circuit section for ANDing the delayed pulse signals to generate a key mark sensing pulse corresponding to each of the key mark pulse trains; a counter circuit connected to the synchronizing circuit and the AND gate circuit for counting a scanning time and/or the number of scanning lines up to the position of each of the key marks, in response to the synchronizing signal corresponding to a start of the first scanning line and the key mark sensing pulse; and a calculating circuit connected to the counter circuit for calculating respective coordinates of the key marks on the scanning area on the basis of the contents of the counter circuit; and an arithmetic unit connected to the calculating circuit for computing a center coordinate of the object on the scanning area on the basis of the coordinates of the key marks.

9. An apparatus according to claim 8 wherein the delay circuit section comprises a plurality of series-connected delay circuits each having a delay time equal to an integrated multiple of scanning time of one scanning line, said image pulse signal passing through the delay circuits in series, said delay circuits producing said delayed pulse signals.

* * * * *